United States Patent [19]

Hekmatpour

[11] Patent Number: 5,799,292
[45] Date of Patent: Aug. 25, 1998

[54] ADAPTIVE HYPERMEDIA PRESENTATION METHOD AND SYSTEM

[75] Inventor: Amir Hekmatpour, Austin, Tex.

[73] Assignee: International Business Machines Corporation, Armonk, N.Y.

[21] Appl. No.: 533,120

[22] Filed: Sep. 25, 1995

Related U.S. Application Data

[63] Continuation-in-part of Ser. No. 235,301, Apr. 29, 1994, Pat. No. 5,644,686.
[51] Int. Cl.$^6$ ........................................ G06F 17/30
[52] U.S. Cl. ........................ 706/11; 707/513; 345/333
[58] Field of Search .............................. 395/762, 344, 395/345, 346, 615, 356, 765, 778, 12, 200.47, 200.48, 200.49; 340/825.19; 434/112; 345/337, 333, 334, 356; 707/501, 515, 513

[56] References Cited

U.S. PATENT DOCUMENTS

| | | | |
|---|---|---|---|
| 4,964,077 | 10/1990 | Elsen et al. | 345/337 |
| 4,984,152 | 1/1991 | Muller | 345/333 |
| 5,103,498 | 4/1992 | Lanier et al. | 395/12 |
| 5,195,178 | 3/1993 | Krieger et al. | 395/157 |
| 5,201,034 | 4/1993 | Matsuura | 395/155 |
| 5,204,947 | 4/1993 | Bernstein et al. | 345/357 |
| 5,333,237 | 7/1994 | Stefanopoulos et al. | 395/12 |
| 5,337,407 | 8/1994 | Bates et al. | 345/331 |
| 5,367,626 | 11/1994 | Morioka et al. | 395/159 |
| 5,388,251 | 2/1995 | Makino et al. | 345/337 |
| 5,416,903 | 5/1995 | Malcolm | 345/333 |
| 5,446,891 | 8/1995 | Kaplan | 395/600 |
| 5,506,937 | 4/1996 | Ford et al. | 395/12 |
| 5,515,496 | 5/1996 | Kaechler et al. | 345/334 |
| 5,530,852 | 6/1996 | Meske, Jr. et al. | 707/501 |
| 5,535,321 | 7/1996 | Massaro et al. | 345/337 |
| 5,572,643 | 11/1996 | Judson | 395/200.48 |
| 5,608,426 | 3/1997 | Hester | 345/153 |
| 5,694,594 | 12/1997 | Chang | 395/606 |

OTHER PUBLICATIONS

P. Blenkhorn, "Adaptable and Configurable Systems to Enable Disabled People to Access Computer Systems." IEE Colloquium on 'Special Needs and the Interface', pp. 3/1–2, Jan. 1993.

T. Berners–Lee and D. Connolly, Hypertext Markup Language (HTML), pp. 1–48, Jun. 1993.

B. Pfaffenberger, Mosaic User's Guide, MIS Press, pp. 198–199, Dec. 1994.

B. Smith, "Internet with Style," Byte, pp. 197, 198, 200, Jan. 1995.

N. Randall, "Untangle the Web with Mosaic," PC Computing, vol. 8(2), pp. 206(3), Feb. 1995.

R. Bellinger, "Finally, 'accessibility' for Windows 95," Electronics Engineering Times, n841, pp. 77(2), Mar. 1995.

A. Poor, "Using adaptive technology," Computer Shopper, vol. 15(5), pp. 218(2), May 1995.

G. Fleishman, "There's more to a Web server than meets the eye."InfoWorld, vol. 17(25), pp. 63(3), Jun. 1995.

J. Lazzaro, "Windows 95 seees better future," Byte, vol. 20(6), p. 36, Jun. 1995.

"Beware of Web Site Hit Statistics," Newsbytes, p.NEW08100026, Aug. 1995.

Glover, "How expert systems can make hypertext more useable," Technical Communications (ITCO) v41 n4 pp. 628–634, Nov. 1994.

Dunne & Verbruggen, "Navigation in a hypertext using dynamically constructed guided tours," Informatique '93, 2nd int'l conf on interface to real & virtual worlds, pp. 236–272, Mar. 1993.

*Primary Examiner*—Robert W. Downs
*Attorney, Agent, or Firm*—Heslin & Rothenberg, P.C.

[57] ABSTRACT

In a computer system comprising a hypermedia computing environment, the presentation of hypermedia objects is adapted to usage of the system. The frequency with which hypermedia objects are used is tracked and the objects are ordered such that the most frequently used hypermedia objects are made most accessible. The system also adapts to user characteristics such as user experience level, user disabilities and user preferences. For example, hypermedia objects inappropriate for beginner users are not displayed when a novice is using the system. Further, visual hypermedia objects are ordered ahead of audio hypermedia object for hearing impaired users.

38 Claims, 11 Drawing Sheets

5,799,292

1

ADAPTIVE HYPERMEDIA PRESENTATION METHOD AND SYSTEM

RELATED APPLICATION

This application is a continuation-in-part of the U.S. patent application entitled "EXPERT SYSTEM AND METHOD EMPLOYING HIERARCHICAL KNOWLEDGE BASE, AND INTERACTIVE MULTIMEDIA/ HYPERMEDIA APPLICATIONS," Ser. No. 08/235,301, now U.S. Pat. No. 5,644,686 filed Apr. 29, 1994, which is incorporated herein by reference, in its entirety.

TECHNICAL FIELD

The present invention relates to interactive multimedia/ hypermedia systems and methods. More specifically, the present invention relates to techniques for adaptive presentation of hypermedia information systems.

BACKGROUND OF THE INVENTION

Hypermedia information systems are very useful in many applications. One such application is training in a manufacturing environment. Although aspects of the present invention are discussed with respect thereto, such aspects remain generally applicable in all hypermedia information systems.

Manufacturing enterprises can employ hundreds and sometimes thousands of permanent and temporary system operators and technicians. Currently, a multitude of methods are used for educating and assisting such manufacturing personnel. These methods include informal, unstructured training sessions, printed 'in-house' manuals, classroom instruction, and walk-through orientations to name but a few. In the manufacturing environment, the student population grows with every group of new employees, whether temporary or permanent. This student group is typically large and decentralized and cannot be released from the manufacturing line simultaneously to attend a standardized training course.

Interactive multimedia training and certification can present consistent subject matter, on a flexible twenty-four hour, seven day per week schedule. The subject matter delivered to the trainee is guaranteed to be consistent, thus avoiding reliance on a thorough presentation of material by a knowledgeable technician. Currently, with the use of printed documents there is always an uncertainty as to whether the line operator is using the most current version or whether an operator's training in fact covers a latest version of a processor tool upgrade. By making the information available on-line, positive control over the information being disseminated is obtained.

On-line hypermedia systems offer great promise for capturing experience and for providing multifaceted access to support a user engaged in a complex task. A primary issue in building such systems is how to structure the knowledge contained in them such that a user with a problem can find the most appropriate knowledge easily and naturally. In addition, such a system should learn from, and adapt to, its environment and improve its interaction with the user. Such adaptivity is necessary to overcome the inefficiency of traditional book model on-line systems, and to enhance the ever-increasing functionality of educational hypermedia information systems.

As a further problem associated with traditional computer-based training, such systems are typically based on a simple single user model. Regardless of the familiarity or lack of familiarity of the trainee with the topic, all trainees

2 go through the same training process. A new employee who has never worked in a similar environment is given the same training material as an employee who has many years of related experience and might have been transferred to a new assignment from a similar area. Certification and qualification procedures are usually conducted orally in an ad-hoc fashion and are subject to a trainer's judgment and biases. In addition, there is no formal methodology for increasing the responsibility of a trainee as the training proceeds. In order for a computer-aided training system to acquire the necessary flexibility, it should distinguish between several types of students and structure the training material according to a student's needs, habits, preferences and background.

The present invention is directed toward solutions to the above-noted problems.

DISCLOSURE OF INVENTION

Briefly described, in a first aspect, the present invention operates within a hypermedia computing environment having a display window and multiple hypermedia objects therein. The invention includes a method for managing presentation of the multiple hypermedia objects and comprises acquiring an adaptation parameter and automatically adjusting the presentation of the multiple hypermedia objects within the display window in response to the adaptation parameter.

As an enhancement, the acquired adaptation parameter may comprise a frequency of use characteristic of at least one of the multiple hypermedia objects. Further, the presentation of the multiple hypermedia objects may include automatically adjusting a display order of the multiple hypermedia objects within the display window in response to the frequency of use characteristic. Specifically, a most frequently used hypermedia object of the multiple hypermedia objects may be displayed at the most accessible (e.g., top) location of the display window.

As a further enhancement, at least one of frequency of direct selection and frequency of indirect selection of the at least one hypermedia object may comprise the adaptation parameter. Moreover, the frequency of direct selection and the frequency of indirect selection may be combined into a single frequency of selection value comprising the frequency of use characteristic. The frequency of direct selection and the frequency of indirect selection may each have an individual weight assigned to them with regard to their combination into the single frequency of selection value.

Yet another enhancement comprises determining a user based parameter (e.g., a user impairment) as the adaptation parameter. If the user impairment comprises a hearing impairment, the method may include ordering non-audio based hypermedia objects ahead of audio based hypermedia objects within the display window. If the user impairment comprises color blindness, the method may include altering a color scheme of the presentation of the multiple hypermedia objects to account for the color blindness. A further user based parameter may comprise a user experience level. In such a case, the display of at least one hypermedia object may be suppressed because it is inappropriate for the user experience level.

To summarize, the present invention has many advantages and features associated with it. By providing a dynamic display that automatically adapts to its user's environment, the efficiency of the learning process is increased. Specifically, dynamically organizing the display of hypermedia information according to usage frequency enhances the speed at which a topic of interest is found. Extraneous mouse clicks and object scrolling are reduced. Furthermore, by adapting to a user's personal characteristics (e.g., experience level, disabilities and preferences), similar advantages in efficiency are obtained. Learning is thereby enhanced by not overwhelming a user with unnecessary selections (i.e., hypermedia objects). In addition, the training and information access cost is reduced (i.e., less need for computer time and/or network access) and productivity is increased by having more time to devote to other tasks. Accordingly, the present invention advances the field of computer based hypermedia learning systems.

BRIEF DESCRIPTION OF DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

BEST MODE FOR CARRYING OUT THE INVENTION

Figure 1:
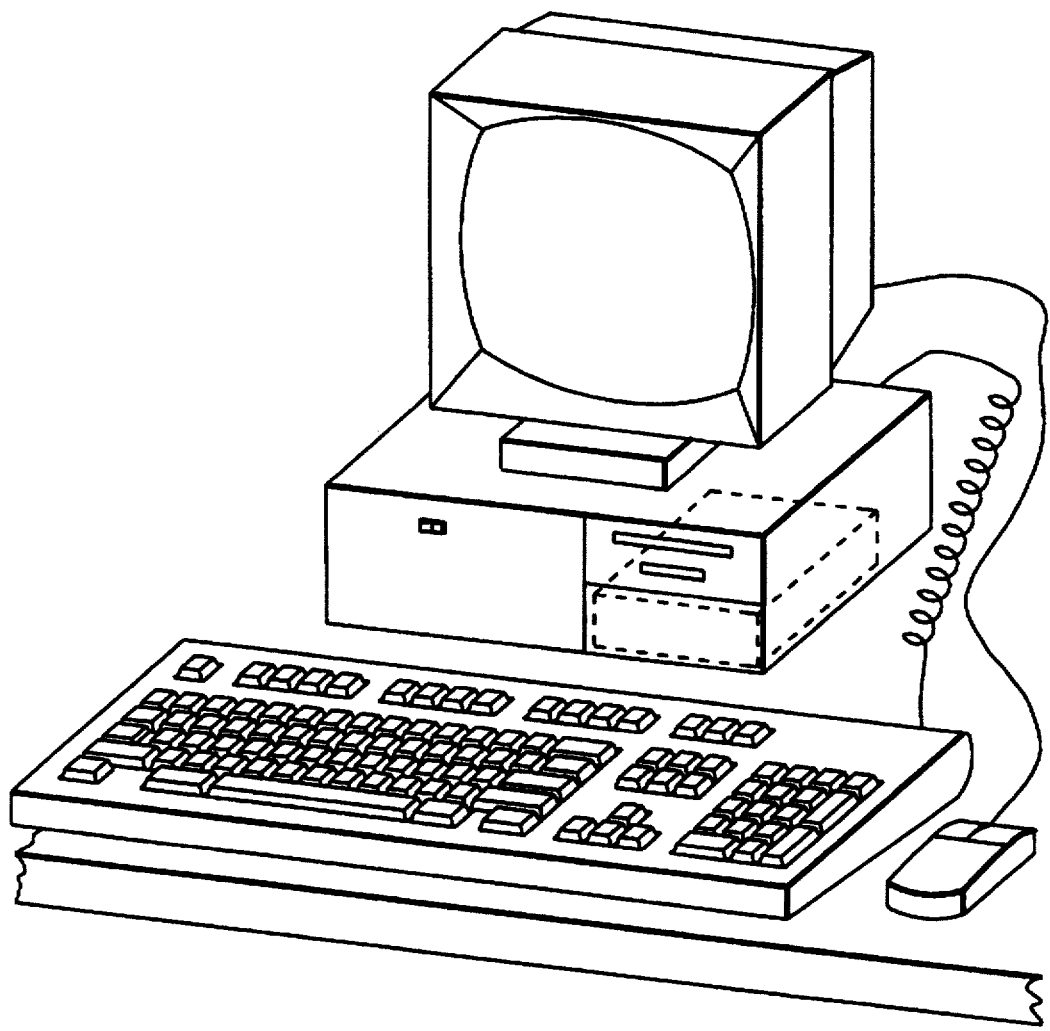
FIG. 1 is a perspective view of a computer system upon which a hypermedia system in accordance with the present invention may be implemented.
Figure 2A:
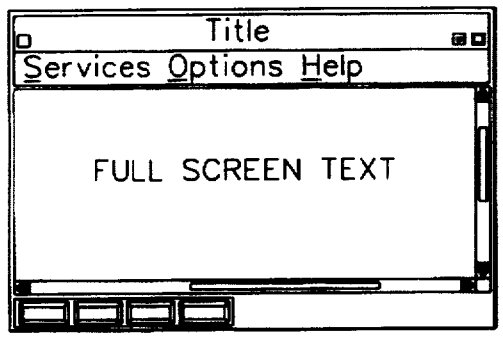
FIGS. 2a–2p depict standardized programmable templates (referred to herein as "logical pages") for use in a hypermedia system in accordance with the present invention.
Figure 2B:
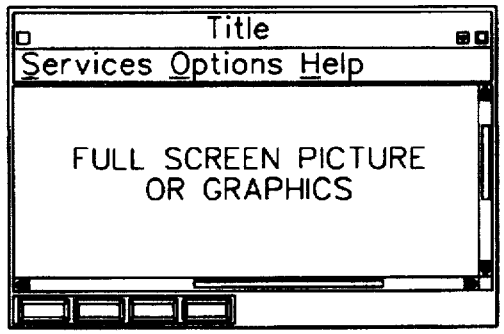
Figure 2C:
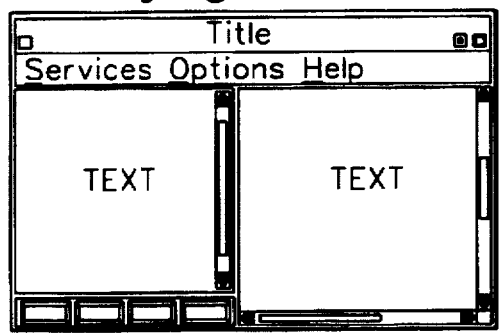
Figure 2D:
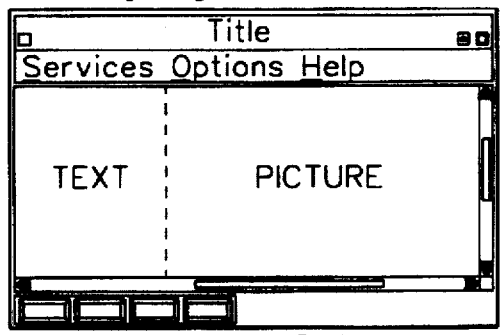
Figure 2E:
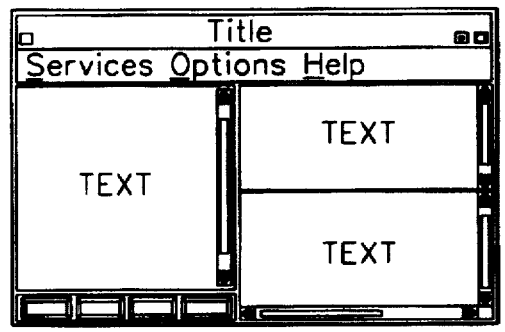
Figure 2F:
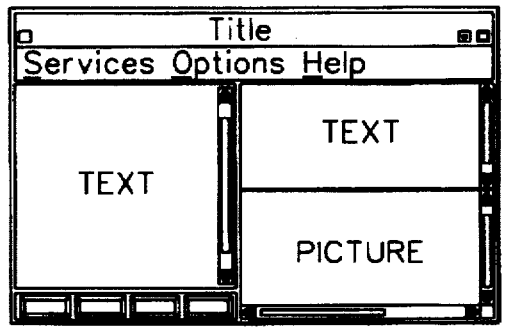
Figure 2G:
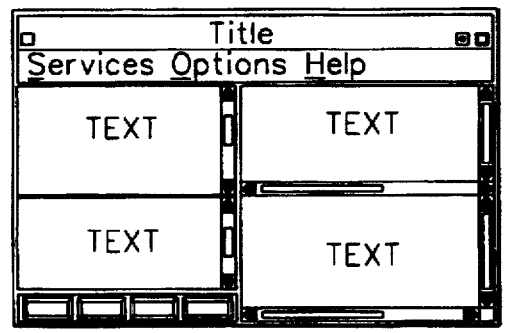
Figure 2H:
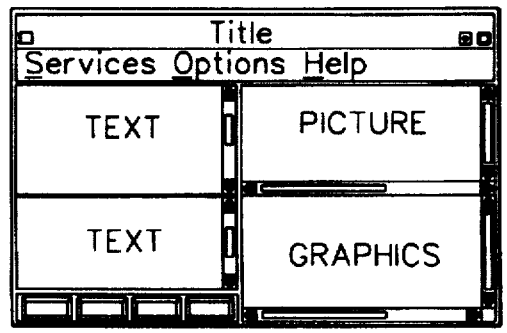
Figure 2I:
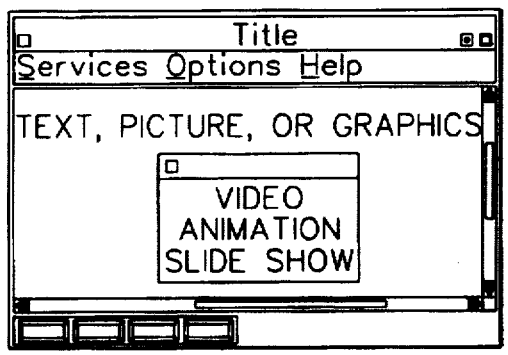
Figure 2J:
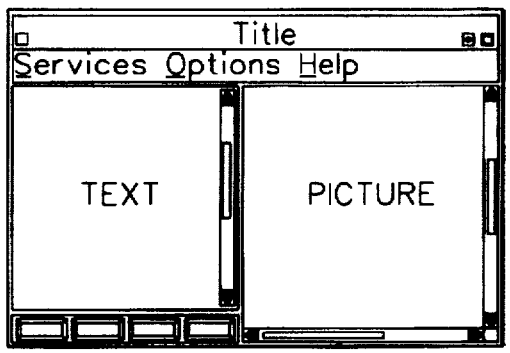
Figure 2K:
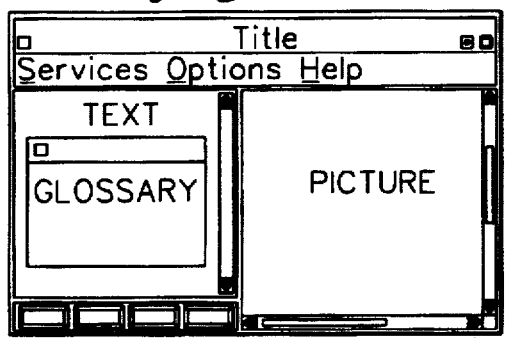
Figure 2L:
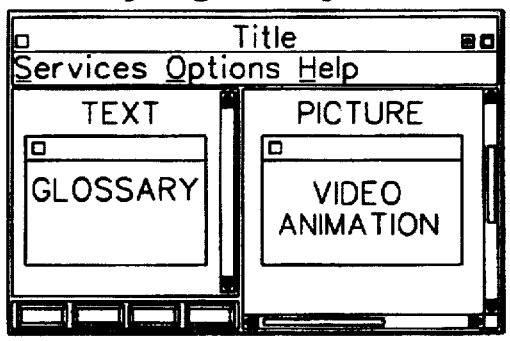
Figure 2M:
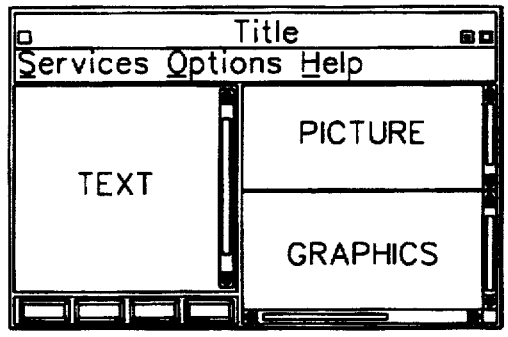
Figure 2N:
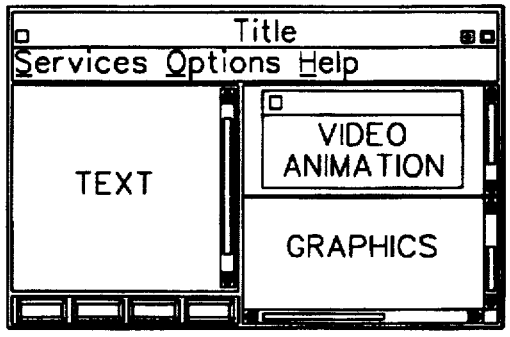
Figure 2O:
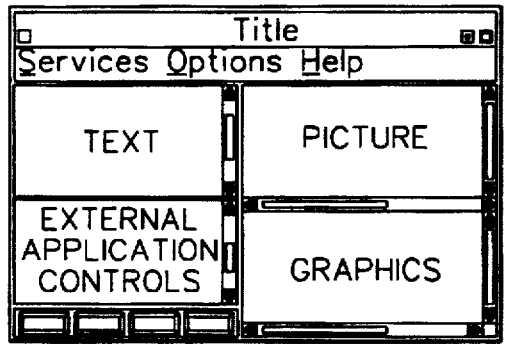
Figure 2P:
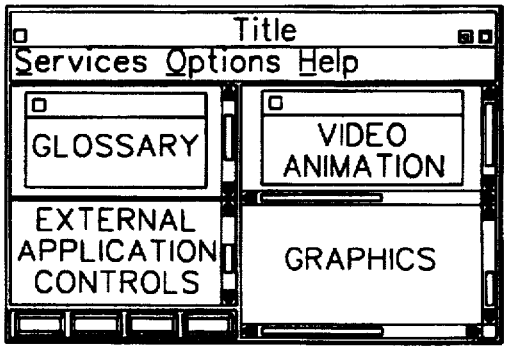

By way of example, FIG. 1 depicts a computer system upon which a hypermedia system in accordance with the present invention can reside. This computer system may comprise, for example, an IBM PS/2 microcomputer system employing a 386 or faster processing chip. In addition to a hard disk and floppy disk drive, the computer system has a video adapter, a video display monitor, an audio output device (e.g., a speaker), a keyboard and a mouse-type data manipulation device, all for user interface with the hypermedia system. If desired, the hypermedia system could be implemented on a portable system, such as a laptop or notebook computer.

As described further below, training modules are hypermedia applications which provide on-line training based on user experience level (beginner, novice, intermediate, expert). The user profile database records user expertise levels, tasks and procedures that users are certified for, certification dates, and work experience histories. The user profile database is maintained by an area administrator and is accessed and updated by the certification modules.

Graphical user interfaces (GUI), multiple screen displays, and windowing capabilities have provided powerful possibilities for user interface design in recent years. Many researchers in the field of human-computer interaction and cognitive science have extensively studied the effects and requirements of such an interface environment on users as well as system design. With the advent of windowing and multiple screen displaying capability, additional issues and concerns have to be taken into consideration in design of computer user interfaces.

Coordinating text, graphics, and images in a hypermedia environment is very important to effective presentation and management of the subject matter. The hypermedia interface methodology of the present invention is based on hypermedia modules that are partitioned into "logical pages." A logical page (e.g., FIGS. 2a–2p & 3a–3b) consists of a set of windows containing images (e.g., still, video, animation, graphics) and all associated description (text and audio). In other words, a logical page is the predefined collection of all related information (e.g., text, graphics, images, audio instruction, animation, video clips) which can be made available to the user. The appearance, format, and access to logical pages is preferably consistent throughout the system. Logical pages are related to each other via hypermedia links. Further, logic pages may include links to external applications, databases and other services.

The logical page organization discussed herein provides physical and logical correlation of the hypermedia objects. Physical correlation is provided by approximate placement and presentation of hypermedia objects in a logical page and among related logical pages. Logical correlation is maintained via hypermedia links among a logical page window's and related logical pages.

To assure a complete and accurate display of a logical page (regardless of how it is accessed), it can only be linked to via its primary window. A logical page, similar to a page of a book, may contain many different hypermedia objects of interest, but can only be opened by a call to its primary window. All other windows in a logical page are either dependent and automatically linked to the primary window (or other secondary windows) or are pop-up windows which are activated via hypermedia links. When a primary window is opened (e.g., via a hypermedia link, selection from table of contents, external call, or as a result of a search) all its dependent secondary windows are opened automatically. A logical page ("LP") has one primary window ("PW") and none, one or more secondary windows ("SW"). The PW is considered a parent window and owner of all SWs in the LP. In an LP, each window (PW or SW) has a unique window number (WN=1, 2, 3 . . . ) and a unique alphanumeric window identification (WI=cover-page, chapter-two, section 3 . . . ) which are used for linking to and selecting a window. The PW's WN is considered the LP number and the PW's WI is the LP identification. The SW's WN and WI are treated as subtopic number and identification within that LP.

Further, all windows in a LP have a group number (WG=1, 2, 3 . . . ). The WG allows grouping windows in a LP based on the type of information they contain, and the purpose or function they serve. Only one window of each group can be active (visible) in a LP at any time. When a new window is initiated in a LP, the window manager searches among the open windows in the LP to find one with the WG matching the new window being initiated. If a match is found, its contents are swapped with the contents of the new window. If no match is found, the window manager opens a new window at the coordinates specified and displays its contents.

Each window in a LP (e.g., PW or SW) contains a set of hypermedia objects (e.g., text blocks, still images, video/animation clips, audio segments, graphics, charts, push buttons, and hypermedia links). For example, in the LP of FIG. 3a, the PW contains three hypermedia objects (one title and two paragraphs) and a hypertext link to a pop-up window ("Wafer"). The SW1 contains a still image with a hot-spot. A hot-spot is a selection area/window which the user can select by double clicking on it, and it contains multiple hypermedia links referred to herein as "hot spot functions." The SW2 contains a chart object and the pop up SW3 contains a text object.

Figure 3A:
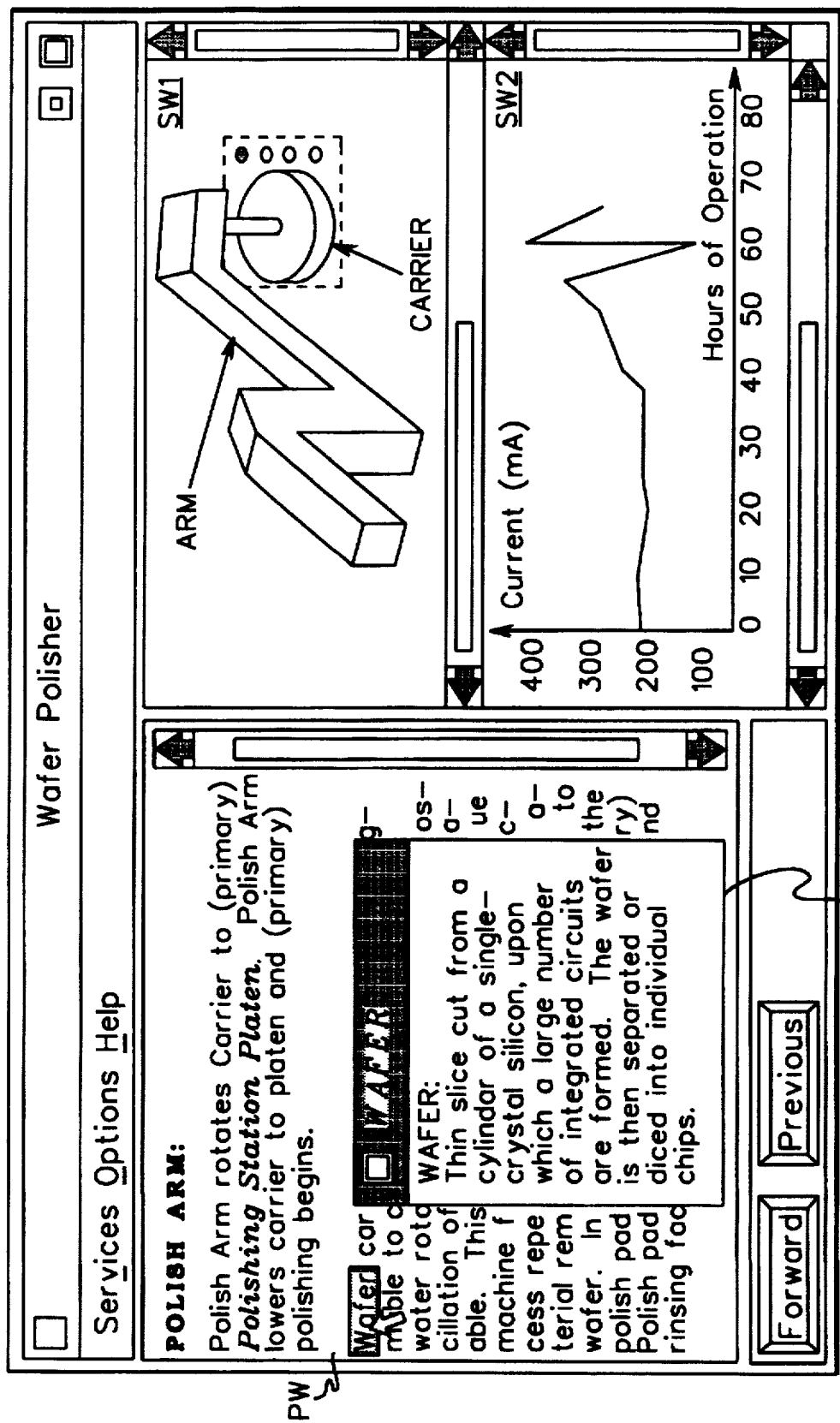
FIGS. 3a and 3b are examples of logical pages of a hypermedia module employing templates of FIGS. 2a–2p.
Figure 3B:
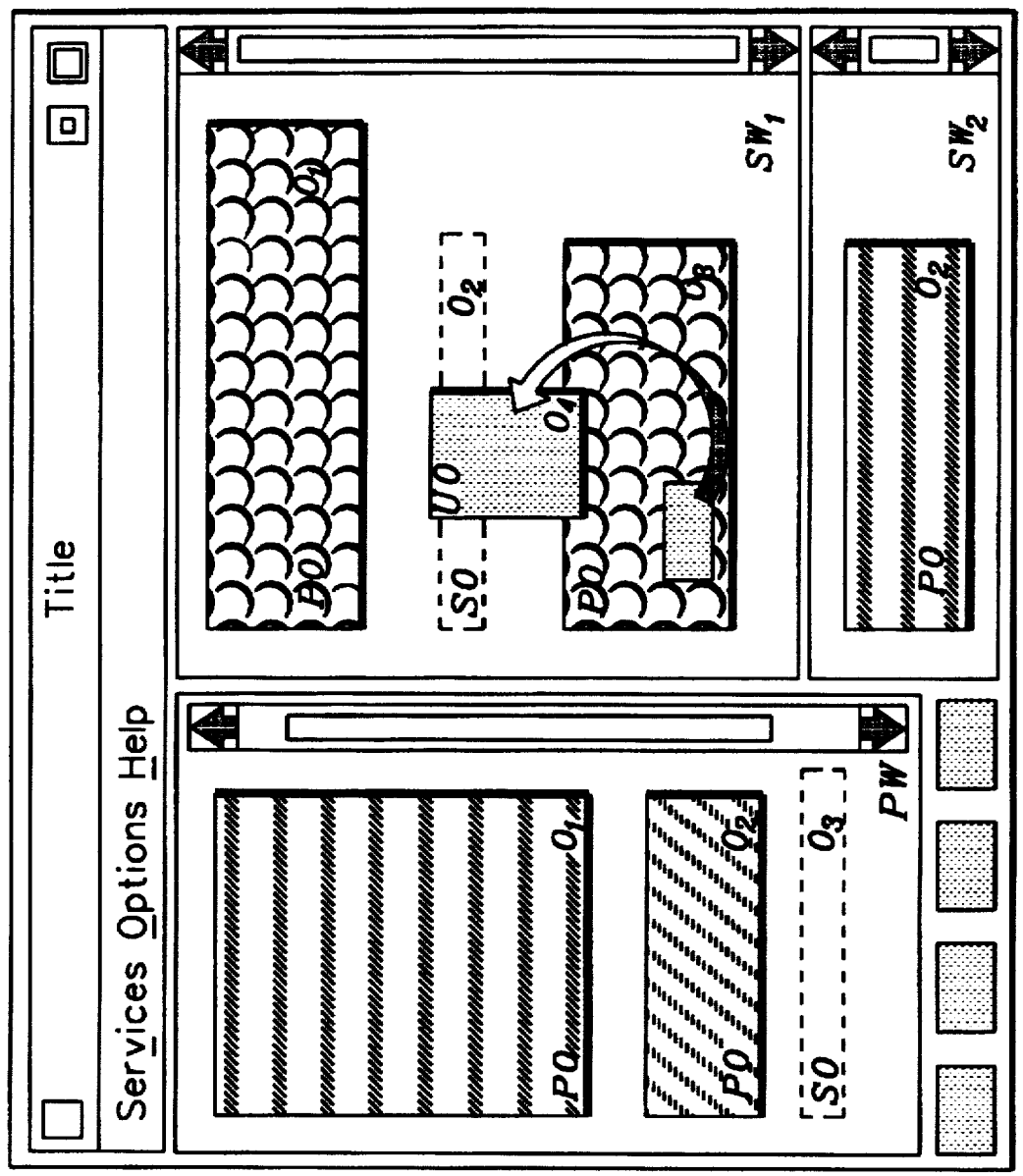

By way of further explanation, with regard to FIG. 3b, hypermedia objects in a LP are either primary objects (PO), secondary objects (SO), pop-up objects (UO), or hidden objects (HO). POs are automatically activated (displayed) whenever their parent window is displayed. SOs have a place holder in the window but are not automatically displayed (e.g., hypermedia object O3 in PW and hypermedia object O2 in SW1 in FIG. 3b). SOs are displayed via direct (user selection) or indirect (hypermedia link) activation and are usually hypermedia utilities that require large amounts of computer resource (e.g., video, animation, audio) and therefore it is not practical to activate them by default every time the LP or their parent window is activated. The end-user should be made aware of these utilities and be allowed to decide when to activate them. UOs have no place holders in the window and simply pop-up in the pre-specified coordinates (or at the center of the parent window by default) when activated (e.g., O4 in SW1). UO activation is usually via a hypermedia link and is suitable for footnote and warning messages. HOs are POs or SOs that are hidden (temporarily removed from presentation) based on conditions defined at development time.

In addition to containing content, each hypermedia object contains a set of attributes describing its e.g., type, display order, style, hide condition, and usage frequency as described by the following list:

Object ID (OI) A unique alphanumeric ID (e.g., object1, 0_99, 101)

Object Type (OT) e.g., PO, SO, UO, and HO

Object Content Type (OCT) e.g., paragraph, still image, ordered list, ...

Object Content (OC) e.g., 'Some text', 'c:\images\image99.tif'.

Object Content Method (OCM) A method for initializing and updating the content

Logical Page ID (LPI) The LP containing the object

Logical Page Style (LPS) The style of LP containing the object

Window Number (WN) Object's parent Window number (e.g., 1234)

Window ID (WI) Object's parent Window ID (e.g., Monthly_Sales_Chart)

Window Group (WG) Object's parent Window group

Window Type (WT) Object's parent Window type (e.g., PW, SW)

Display Order (DO) The relative order of appearance of the object in the window

Display Order Method (DOM) A method for initializing and updating the value of DO Activation Freq. Coef. (AFC) A number representing the frequency of object activation AFC Method (AFCM) A method for initializing and updating the value of AFC Hide Condition (HC) A variable-value pair (e.g., user_level=beginner)

The modular structure of the LP supports object sharing among pages. This means the same object instance (text, image, video, ...) can be referenced in several different LPs but only defined once at authoring time and loaded once at run time. Each reference needs to define only those object attributes different from the first instance of the object (e.g., LPI, WI, WT, WG, DOM, AFCM, HC). The generic objects (e.g., safety procedures and warnings) and storage intensive objects (e.g., still images, video and audio clips) can usually be shared and therefore loaded only once for a module. This is very useful when an image, a video clip, an animation or a text segment is referenced many times in a courseware.

Figure 4A:
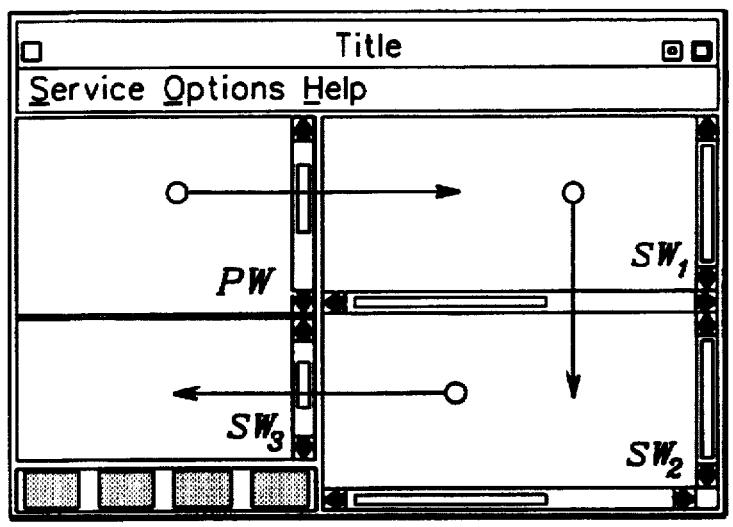
FIGS. 4a–4c are examples of window chaining in a logical page and activation sequences of windows in a logical page according to the techniques of the present invention.
Figure 4B:
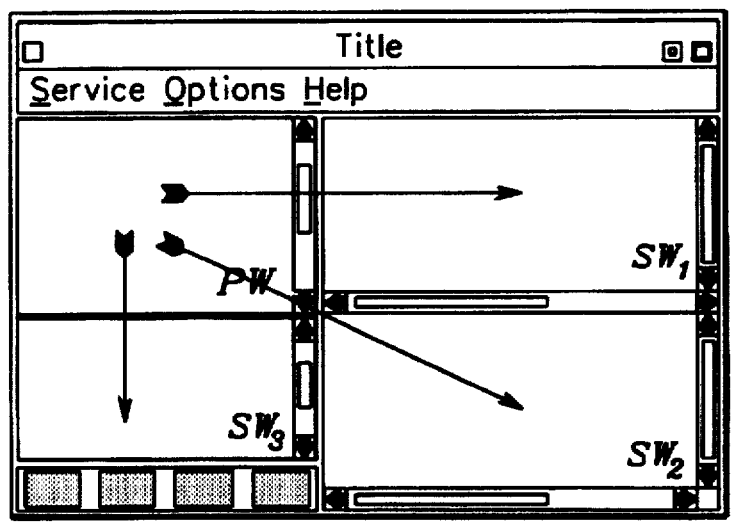
Figure 4C:
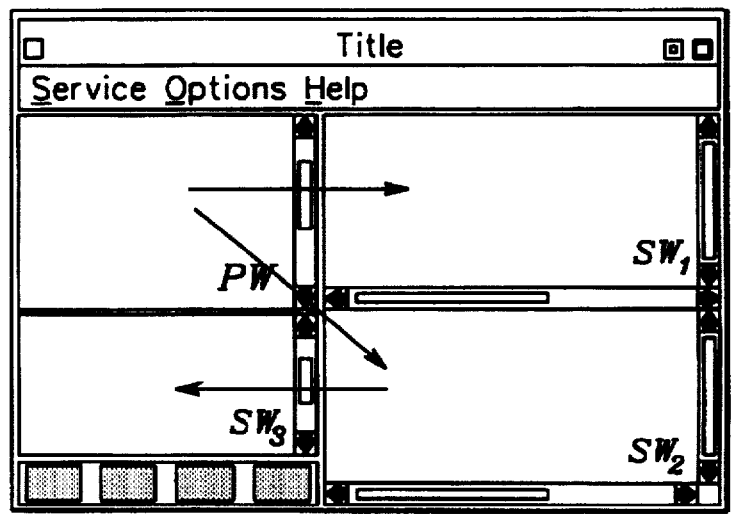

When an LP is activated, its PW is automatically displayed. The PW in turn activates at least one SW (if there is one). Other SWs of the LP may get activated by the PW or the other SWs. FIGS. 4a–4c depicts three example scenarios. In FIG. 4a, the PW activates SW1, and SW1 activates SW2, which in turn activates SW3 (PW→SW1→SW2→SW3). In other words, SW1 is dependent and chained to PW, SW2 is dependent on SW1 and SW3 is dependent on SW2. In FIG. 4b, PW activates all secondary windows (PW→SW1:SW2:SW3) meaning all secondary windows are dependent on and chained to PW. In FIG. 4c, PW activates SW1 and SW2 in turn activates SW3. A window chaining scheme is selected at development time based on the relation between windows in an LP. In FIG. 4a, only SW1 is directly related to PW, whereas in FIG. 4b, all three SWs are directly related to PW (i.e., SW1, SW2, and SW3 are subsections of the topic covered in PW).

Figure 5A:
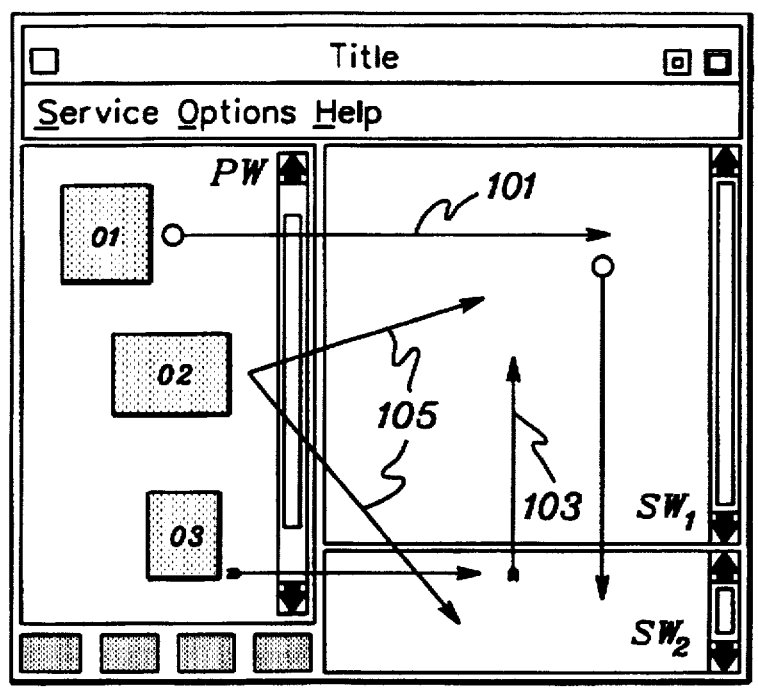
FIGS. 5a and 5b are examples of hypermedia objects updating other hypermedia objects in a logical page in accordance with one embodiment of the present invention.

In some cases it is necessary to update contents of a window in an LP in response to activation of an object in the same or other windows. In other words, an object may update another object in the LP (in the same or a different window) or it may update the entire contents of a window in the LP. For example, the PW may contain names of people in an organization, the SW1 may include the individuals' pictures, and SW2 displays the employee profiles. In this case, when the user selects a name in the PW, the contents of SW1 and SW2 need to be updated. This can be handled in two different ways:

1) PW updates the contents of one of the secondary windows (FIGS. 5a, 101), which in turn updates the contents of all other dependent and related secondary window (103).

2) PW updates the contents of all dependent and related windows directly (105).

Figure 5B:
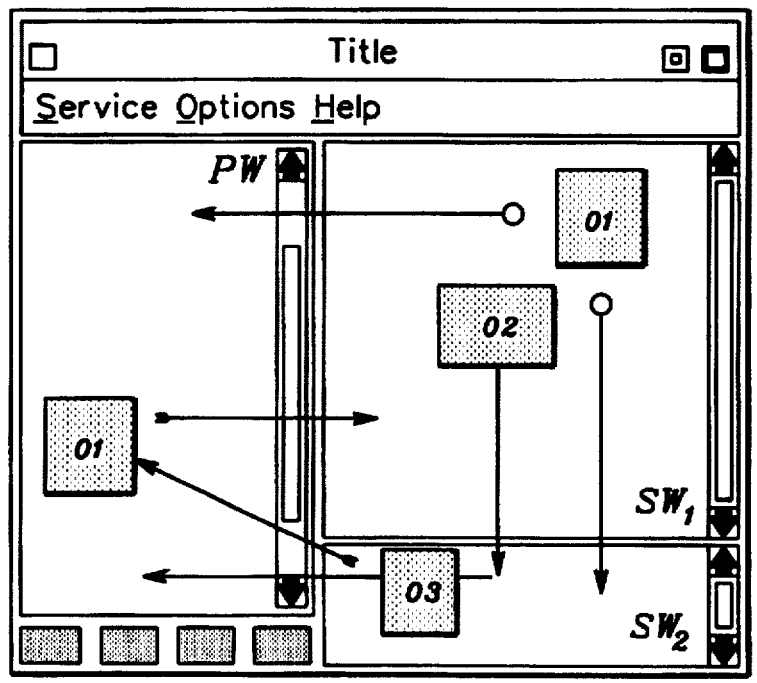

Of course, the initiating window (i.e., the window containing the object which initiates the updating) does not have to be a PW. FIG. 5b shows three examples of an object in a SW initiating update of the PW as well as other SWs.

Updating a window involves repainting or refreshing its contents or repainting the entire LP. Although it is possible to refresh only those objects which need to be updated rather than the entire contents of the window or LP, our current implementation does not support direct object updating.

In conventional multimedia/hypermedia systems, users often suffer from the 'lost in hyperspace' problem comprising distractions from too many jumps while traversing a complex network or too much skimming. In accordance with the present invention, information about the users' goals (i.e., tasks performed in the environment), the active hypermedia objects (i.e., visited LPs), and the strength of association between these hypermedia objects (i.e., their AFCs) is used to dynamically alter the presentation of the hypermedia objects.

The hypermedia objects in a window are describable as an ordered list presented to the user for selection and/or review. Initially, these hypermedia objects are ordered according to the author's description (i.e., objects' initial DO value). This initial ordering may not be a good representation of the deployment environment, although it might have been a good representation at one time or for some other environment. It is therefore advantageous for the system to dynamically adapt to the environment. This adaptation includes, for example, rearranging hypermedia objects presented to the user based on likelihood of usefulness, relevancy, usage, and even past experiences.

With a static presentation, users need to examine an average of N/2 hypermedia objects (N=total number of hypermedia objects in a window) to find a target object. With a properly ordered object list it would take (M/(N/2)=2M/N) as much search (skimming) before the user reaches the desired hypermedia object, wherein M is the number of hypermedia objects presented prior to the target hypermedia object in the active window. Eventually M approaches zero as the system adapts to the environment. Accordingly, as adaptation progresses, users of the system will find all the relevant hypermedia objects at the most accessible (e.g., top) of the subject window, thereby reducing (and eventually eliminating) search, scrolling, and skimming.

The hypermedia object's AFC (Activation Frequency Coefficient) is used to discriminate among hypermedia objects of a LP and to coordinate their presentation to the end-user. To explain, AFC is a measure of how frequently a hypermedia object is used (i.e., accessed/selected) in an environment. An object's AFC is a representation of its usefulness in the current environment and therefore its presentation (i.e., display order/placement) should reflect that. In essence, this principle makes the assumption that the more an object was used in the past the more likely it is to be useful now and in the future. An assumption is thus made that all users of the hypermedia courseware are performing the same or similar tasks. For example, all students in a science lab usually perform a set of similar tasks, and therefore their use of an on-line training system or lab process documentation is based on a common set of goals.

The system may also employ AFC in adapting to individual users of the system. A user's profile may include saved object attributes (e.g., AFC) for the hypermedia objects in the hypermedia system. These values may be loaded when the user logs into the system, thereby restoring the objects attributes corresponding to the particular user. Upon exiting the system, the current state of the object attributes are saved in association with the particular user such that they may be restored when the particular user logs in again.

In regard to the operation of AFC and its related parameters, whenever a window is activated, all its hypermedia objects are displayed according to their display order (DO). DOs specify the positional order in which hypermedia objects (or their place holders) are displayed in a window. For example, if an object's display order is 2, the object would be the second one displayed in the subject window (the display method could be, e.g., horizontal, vertical, diagonal or stacked).

DO is a function of a hypermedia object's AFC and is updated based on the object's DOM (Display Order Method). More specifically, the DOM is a procedure which describes how to initialized and update DO. As an example, DOM for an object could specify that DO=3 upon initialization and is updated according to frequency of use. More specifically DO could be updated according to DO=DO−Floor|(2AFC−ΣAFC)/T|, where AFC is the object's AFC, ΣAFC is a sum of all object's AFC in that window and T is a reordering threshold (e.g., T=5). As a further example, DOM could specify that DO is decreased by one if a new object is deleted, and increased by one if an object is inserted preceding the current object.

A hypermedia object's AFC is initialized with a value of 0 and is changed each time the object is accessed. Specifically, the object's AFC is changed by a value delta (Δ) each time the object is activated. The value of Δ depends on the type and source of activation and is determined by AFCM. As a simple example, AFCM could designate Δ=1 for every type of activation. As a more complex example, AFCM could specify different values for Δ depending on the type of object activation. For direct activation of the hypermedia object (i.e., by a user) Δ could equal 1, while for indirect activation on the hypermedia object (i.e., called by another object) Δ could equal 0.5. Accordingly, the weighting of an indirect activation would be half that of a direct activation. If DOM comprises frequency of use, repeated direct activation of an object will therefore result in the object moving to the top of a window (DO=1) twice as fast as repeated indirect activation of the object. As other variations, Δ could vary based upon the source of activation (e.g., from a PW, SW, Table of Contents, Search result, etc.). The application developer (courseware author) assigns the initial values of DO, AFC, T and Δ and defines DOM, AFCM, OCM and HC.

Operationally, the window manager tracks hypermedia object activation and updates the objects' AFC based on their AFCM. When a LP is activated, the window manager calculates object DOs and displays objects of each window according to their new DOs.

Figure 6A:
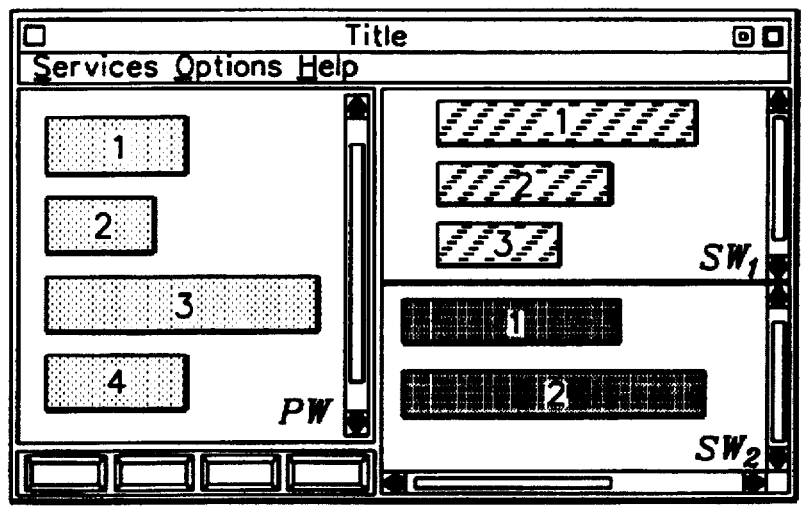
FIGS. 6a–6c depict the adapting of the hypermedia objects of a logical page in accordance with usage thereof pursuant to an embodiment of the present invention.
Figure 6B:
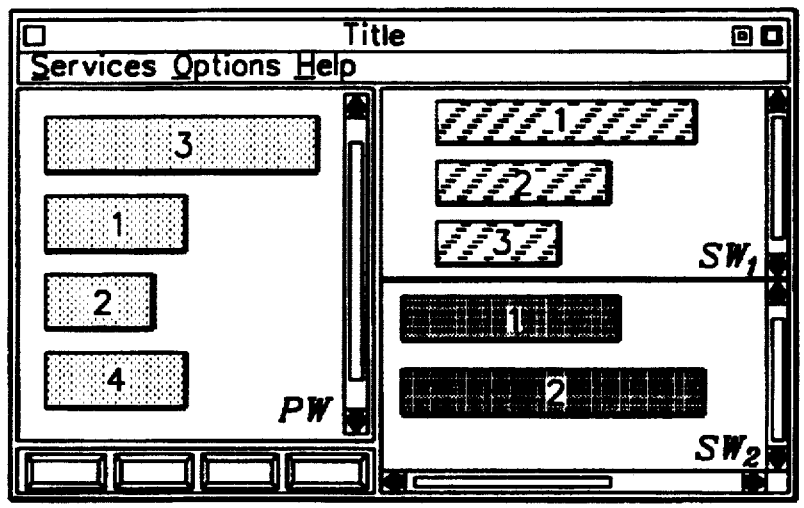
Figure 6C:
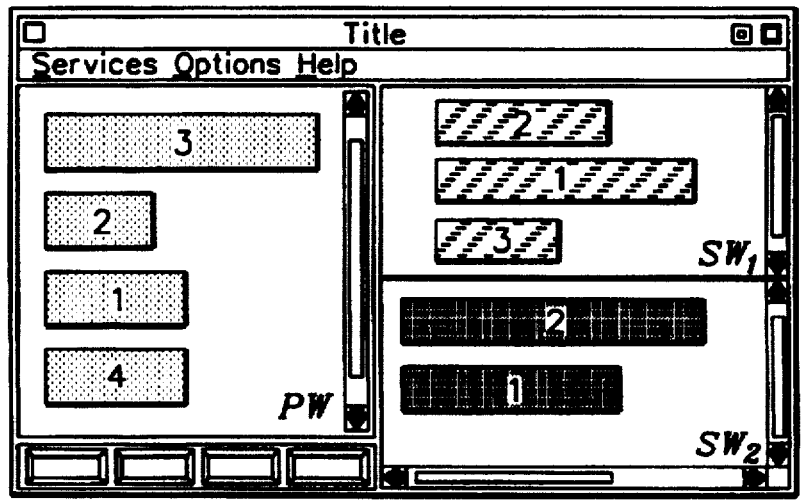

FIGS. 6a–6c shows two examples of the adaptation process of a LP. In both examples DOM comprises ordering by frequency of use. In the first example (the transition from FIG. 6a to FIG. 6b), hypermedia object 3 in the PW is the most frequently used object and accordingly moves to the top position in the PW (DO=1). In the second example (the transition from FIG. 6a to FIG. 6c), objects 2 and 3 in the PW, object 2 in SW1 and object 2 in SW2 are the most frequently used. As designated by DOM, these most frequently used hypermedia objects are moved to top positions in their respective windows. In the case of a DO assignment conflict (e.g., objects 2 and 3 both have a new DO=1), ordering may be determined by, for example, the most recently selected object or the objects' relative prior positions.

In addition to updating the order of appearance of hypermedia objects, objects may also be dynamically removed (hidden) from the LP based on predefined conditions. To hide an object, it has to be of a Hide Object (HO) type. A HO has a "Hide Condition" ("HC") attribute which specifies a variable-value pair (e.g., user_level=advanced; video_card=no; test_score>90;). If a window contains an object type of HO, the window manager evaluates its hide condition whenever the window is activated or repainted. If the condition is true, the object is not displayed. If there are other objects in the window, those are shifted accordingly to fill up the gap. The HO feature is very useful in customizing the information presented to the user (i.e., the contents of the LP) based on predetermined criteria. For example, specific sections or segments of a LP as well as hypermedia objects can be hidden from a user based on experience level, job duties, needs, or changes in system configuration. These criteria could represent the user environment as well as the user's habits and usage trends. In other words, the system adapts to the user by dynamically suppressing display of specific portions of information (i.e., hypermedia objects) as the user progresses through training. For example, in a training document, safety warning objects and detailed explanations suitable for beginners can be hidden from more experienced users. As another example, video objects can be removed if the system does not have a video playback adaptor.

Figure 7:
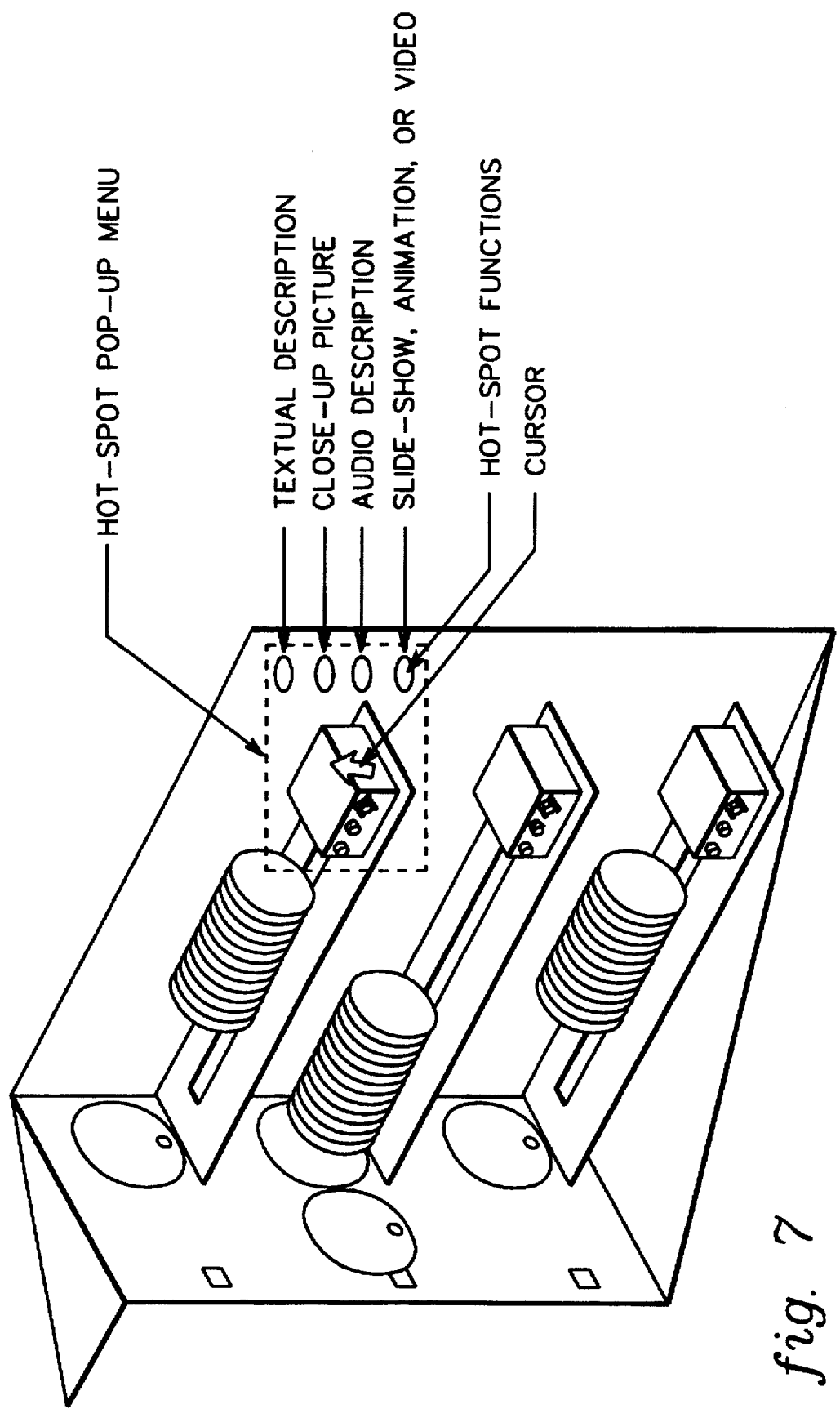
FIG. 7 is a display image representation useful in describing a hot spot pop-up menu in accordance with the present invention.

A further feature of the present invention includes a hot spot selection area (hot-spot) on an image. Each hot-spot can have several selectable functions comprising hypermedia links as shown in FIG. 7. When a hot spot is selected (by clicking on its hot-spot area) its pop-up function menu of the hypermedia links is displayed. The user can then select any of the functions. Hot-spot functions allow the user to decide what form of additional information should be presented. In other words, hot-spot functions provide navigation between an object and its related information nodes in the hyperspace.

Figure 8A:
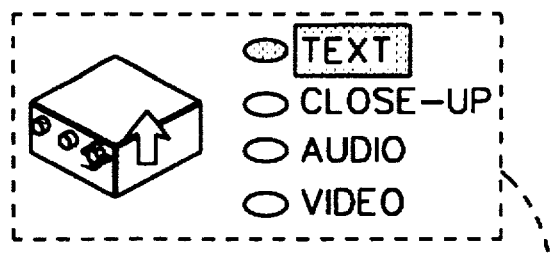
FIG. 8a–9b depict the adapting of hot spot hypermedia links in accordance with usage thereof pursuant to an embodiment of the present invention.
Figure 8B:
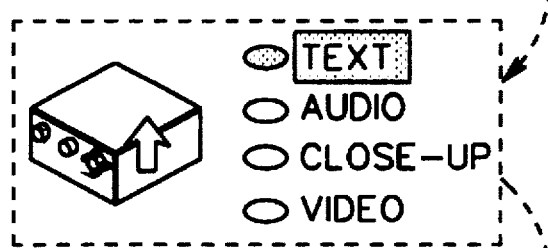
Figure 8C:
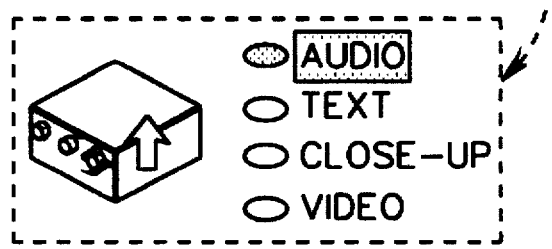
Figure 9A:
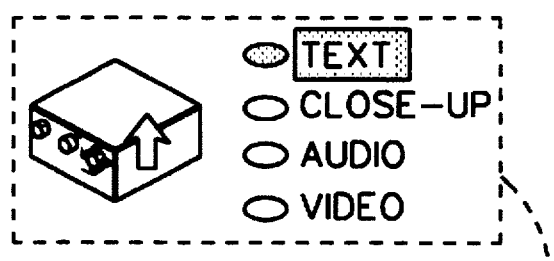
Figure 9B:
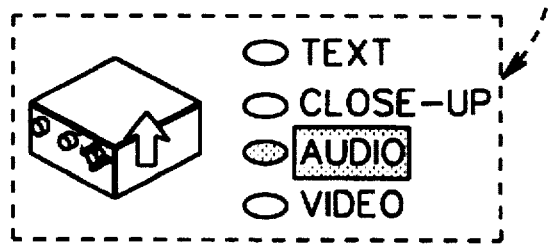

In accordance with the present invention, the hot-spot pop-up functions' appearance and a default function selection adapt to the environment based on the frequency of usage and user habits. Two adaptation examples include: (a) The most frequently activated function moves to the top of the function list (FIGS. 8a–8c); and (b) The most frequently activated function becomes the default function (FIGS. 9a–9b). The default function is automatically selected if the user double clicks on the hot-spot, or hits the Enter key after selecting the hot-spot, or clicks on the highlighted function button. Of course, the user may select any of the hot-spot functions, but the default is the most frequently activated function. For example, if audio is the most frequently selected hot-spot function for a specific hot-spot, then in scenario (a) (FIGS. 8a–8c) the audio function button will gradually move to the top of the function list. In scenario (b), the default function highlight will shift to the audio button (FIGS. 9a–9b).

Adaptation of the presentation of hypermedia objects may be based upon user characteristics other than experience level as discussed above. For example, user impairments/ disabilities may be used to adjust the display of objects using the techniques discussed herein. A user with a hearing impairment has little use for objects with primarily audio characteristics (e.g., audio segments). Therefore, an appropriate DOM could comprise one which orders audio-type objects at the bottom of the window. Audio objects could even be hidden using the HO characteristic discussed hereinabove. In support of this feature, a parameter could be added to user profiles that indicates a hearing impairment and an attribute could be added to each object indicating whether it contains audio information.

In a similar regard to the foregoing discussion of adaptation to a user with a hearing impairment, a visual impairment may be accounted for as well. For example, a user who is color blind may be unable to easily see certain hypermedia objects and the contents thereof. Therefore, the system may change color schemes based upon an indication of color blindness in a user profile. The color scheme change may be performed by substituting distinguishable colors for indistinguishable ones, or, for example, converting displayed images to black and white.

By way of definition, the parameters and variables used herein that influence the dynamic adaptation of the presentation of the hypermedia objects in the display window are referred to herein as "adaptation parameters." These include, but are not limited to, for example, AFC, HC, and user specific parameters (e.g., disabilities and experience levels stored in a user profile).

The adaptation techniques discussed herein reduce the amount of time required for accessing useful and relevant topics/subjects in a hypermedia information system. In addition, the number of unrelated and uninteresting objects browsed, which interfere with the study sequence, are minimized. One of the quantitative measures for the effect of adaptation on studying a subject matter is the number of object scrolls and mouse clicks performed by a user to complete a study. As an example analysis, a hypermedia document comprising an orientation to a semiconductor fabrication facility was selected. The document included over 800 objects and 74 logical pages. The document was originally developed by process technicians responsible for supervising and training the operators in the fabricator.

Figure 10A:
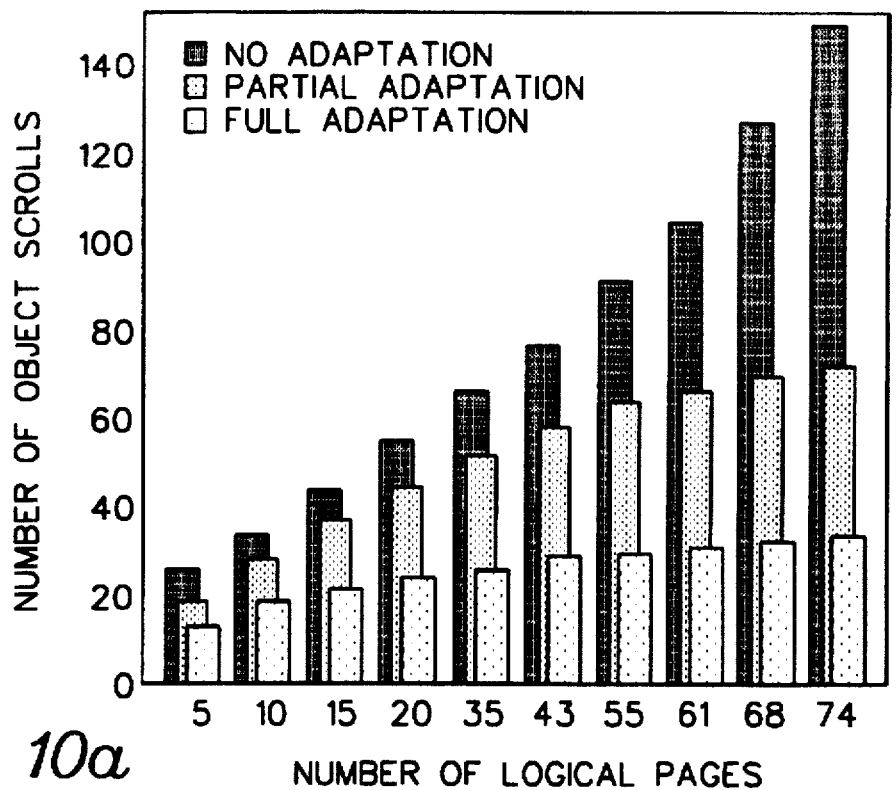
FIGS. 10a and 10b are graphs of the effect of the adaptation techniques of the present invention on the number of object scrolls and mouse clicks performed by users.
Figure 10B:
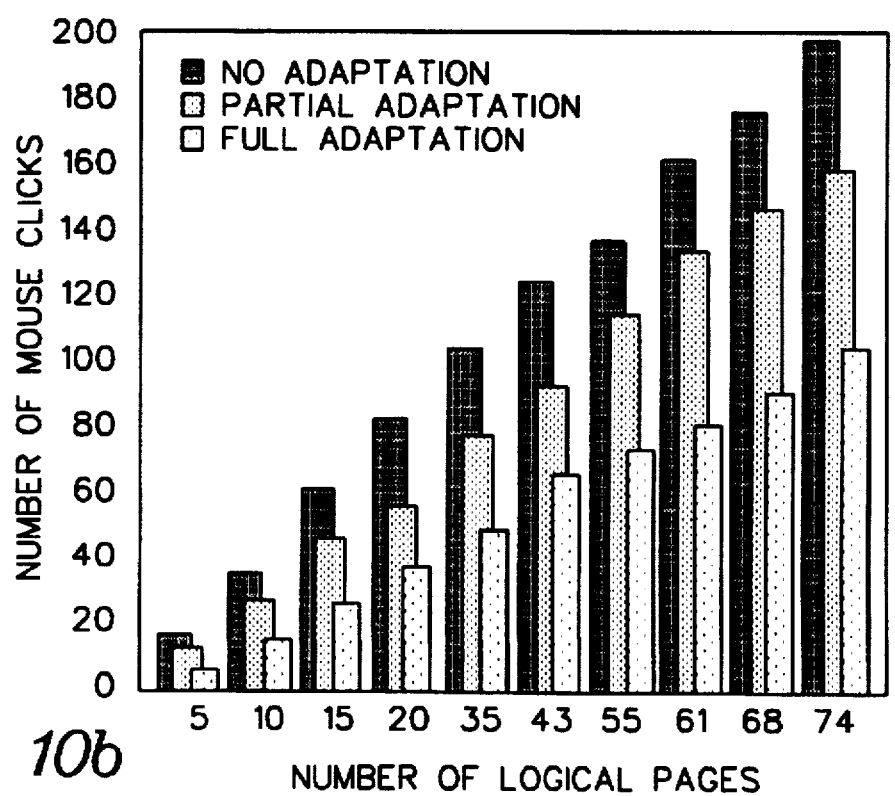

FIG. 10a shows the number of object scrolls for studying half of the topics (selected randomly) in the above document, before, during, and after complete adaptation (i.e., during the first use, after some users have used the system and after many users have used the system, respectively). A complete adaptation is achieved when there is minimal object shifting as a result of reviewing topics. FIG. 10b shows the number of mouse clicks during this study. The results indicate an approximately 50% reduction in object scrolling and mouse clicking for average size hypermedia documents and even larger reduction for larger and more complex documents. Reduction in scrolling and clicking reduces study time, reduces confusion and reduces getting lost in the hyperspace network, while improving comprehension and retention by mitigating the number of irrelevant hypermedia objects reviewed. Accordingly, the present invention advances the field of computer based hypermedia learning systems.

The invention disclosed herein is applicable to many hypermedia environments. Examples include industrial training/education, Computer Based Training ("CBT"), Computer Aided Learning ("CAL"), internet based information presentation (e.g., world wide web browsers) and multimedia educational (e.g., K through 12) applications.

The techniques of the present invention may be implemented using conventional GUI and object oriented programming techniques. The individual programming steps required to implement the present invention will be apparent to one of ordinary skill in the art in view of this disclosure.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

I claim:

1. In a hypermedia computing environment having a logical page and a plurality of hypermedia objects therein, at least some hypermedia objects of said plurality of hypermedia objects comprising information content, a method for managing at least one of information content or presentation of said plurality of hypermedia objects within the logical page, said method comprising the steps of:

(a) acquiring an adaptation parameter; and (b) automatically adjusting at least one of information content or presentation of said plurality of hypermedia objects within said logical page in response to said adaptation parameter;

(c) wherein each hypermedia object of said plurality of hypermedia objects of said logical page contains a set of attributes, said set of attributes including at least some of: an object content method (OCM) for initializing and updating content of the hypermedia object; a display order (DO) representative of order of appearance of the hypermedia object within a window of the logical page; a display order method (DOM) for initializing and updating the value of DO; an activation frequency coefficient (AFC) representing frequency of hypermedia object activation; an activation frequency coefficient method (AFCM) for initializing and updating the value of AFC; and a hide condition (HC) for concealing the hypermedia object from a window of the logical page, and wherein said adjusting step (b) comprises automatically adjusting at least one attribute of said set of attributes of at least one hypermedia object of said plurality of hypermedia objects; and (d) wherein said adjusting step (b) comprises automatically adjusting at least one attribute of at least some hypermedia objects of said plurality of hypermedia objects, said at least one attribute comprising content of the hypermedia object, display order within a window of the logical page, a frequency of use characteristic, or said hide condition.

2. In a hypermedia computing environment having a logical page and a plurality of hypermedia objects therein, at least some hypermedia objects of said plurality of hypermedia objects comprising information content, a method for managing at least one of information content or presentation of said plurality of hypermedia objects within the logical page, said method comprising the steps of:

(a) acquiring an adaptation parameter; and (b) automatically adjusting at least one of information content or presentation of said plurality of hypermedia objects within said logical page in response to said adaptation parameter; and (c) wherein said adjusting step (b) comprises automatically adjusting the display order of said plurality of hypermedia objects by ordering a most frequently used hypermedia object of said plurality of hypermedia objects of the logical page at a top of a primary window of said logical page.

3. In a hypermedia computing environment having a logical page and a plurality of hypermedia objects therein, at least some hypermedia objects of said plurality of hypermedia objects comprising information content, an adaptive method for managing at least one of information content or presentation of said plurality of hypermedia objects within the logical page, said method comprising the steps of:

(a) automatically acquiring within the hypermedia computing environment a user based characteristic or a system utilization based characteristic, and producing therefrom an adaptation parameter;

(b) automatically adjusting at least one of information content or presentation of said plurality of hypermedia objects within said logical page in response to said adaptation parameter; and (c) wherein said automatically acquiring step (a) comprises determining as said adaptation parameter at least one of frequency of direct selection and frequency of indirect selection of at least one hypermedia object of said plurality of hypermedia objects of the logical page.

4. The method of claim 3, wherein said acquiring step (a) further comprises determining said frequency of direct selection by counting a number of times said at least one hypermedia object is directly selected within said logical page.

5. The method of claim 3, wherein said acquiring step (a) comprises determining said frequency of indirect selection by counting a number of times said at least one hypermedia object is called by another hypermedia object of said plurality of hypermedia objects.

6. The method of claim 3, wherein said acquiring step (a) comprises combining said frequency of direct selection and said frequency of indirect selection into a single frequency of selection value comprising said frequency of use characteristic, each of said frequency of direct selection and said frequency of indirect selection having an individual weight assigned thereto with regard to said combining into said single frequency of selection value.

7. In a hypermedia computing environment having a logical page and a plurality of hypermedia objects therein, at least some hypermedia objects of said plurality of hypermedia objects comprising information content, an adaptive method for managing at least one of information content or presentation of said plurality of hypermedia objects within the logical page, said method comprising the steps of:

(a) automatically acquiring within the hypermedia computing environment a user based characteristic or a system utilization based characteristic, and producing therefrom an adaptation parameter;

(b) automatically adjusting at least one of information content or presentation of said plurality of hypermedia objects within said logical page in response to said adaptation parameter; and (c) wherein said automatically acquiring step (a) comprises determining a physiological user characteristic, said physiological user characteristic comprising said adaptation parameter.

8. The method of claim 7, wherein said physiological user characteristic comprises a hearing impairment, and wherein said adjusting step (b) comprises at least one of ordering non-audio based hypermedia objects ahead of audio based hypermedia objects within said plurality of hypermedia objects, removing audio based hypermedia objects within said plurality of hypermedia objects from a window of said logical page, or replacing audio based hypermedia objects with non-audio hypermedia based objects within a window of said logical page.

9. The method of claim 7, wherein said physiological user characteristic comprises color blindness, and wherein said adjusting step (b) comprises altering a color scheme of said presentation of said plurality of hypermedia objects to account for said color blindness.

10. In a hypermedia computing environment having a logical sage and a plurality of hypermedia objects therein, at least some hypermedia objects of said plurality of hypermedia objects comprising information content, an adaptive method for managing at least one of information content or presentation of said plurality of hypermedia objects within the logical page, said method comprising the steps of:

(a) automatically acquiring within the hypermedia computing environment a user-based characteristic or a system utilization-based characteristic, and producing therefrom an adaptation parameter;

(b) automatically adjusting at least one of information content or presentation of said plurality of hypermedia objects within said logical page in response to said adaptation parameter; and (c) wherein said automatically acquiring step (a) includes determining a user experience level, said user experience level comprising said user based parameter.

11. The method of claim 10, wherein said adjusting step (b) comprises suppressing display of at least one hypermedia object of said plurality of hypermedia objects, said at least one hypermedia object having said display thereof suppressed being inappropriate for said user experience level.

12. In a hypermedia computing environment having a logical page and a plurality of hypermedia objects therein, at least some hypermedia objects of said plurality of hypermedia objects comprising information content, an adaptive method for managing at least one of information content or presentation of said plurality of hypermedia objects within the logical page, said method comprising the steps of:
   (a) automatically acquiring within the hypermedia computing environment a user-based characteristic or a system utilization-based characteristic, and producing therefrom an adaptation parameter;
   (b) automatically adjusting at least one of information content or presentation of said plurality of hypermedia objects within said logical page in response to said adaptation parameter; and
   (c) wherein said adjusting step (b) comprises automatically adjusting a display order of said plurality of hypermedia objects within said display window in response to said adaptation parameter.

13. In a hypermedia computing environment having a logical page and a plurality of hypermedia objects therein, at least some hypermedia objects of said plurality of hypermedia objects comprising information content, an adaptive method for managing at least one of information content or presentation of said plurality of hypermedia objects within the logical page, said method comprising the steps of:
   (a) automatically acquiring within the hypermedia computing environment a user-based characteristic or a system utilization-based characteristic, and producing therefrom an adaptation parameter;
   (b) automatically adjusting at least one of information content or presentation of said plurality of hypermedia objects within said logical page in response to said adaptation parameter; and
   (c) wherein said logical page comprises a pop-up, hot spot selection window having multiple hot spot hypermedia functions, each hot spot hypermedia function comprising a hypermedia object of said plurality of hypermedia objects, and wherein said automatically adjusting step (b) comprises automatically adjusting presentation of said multiple hot spot hypermedia functions within said pop-up, hot spot selection window in response to said adaptation parameter.

14. The method of claim 13, wherein said acquiring step (a) comprises determining a frequency of use for each of said multiple hot spot hypermedia functions, said frequency of use comprising said adaptation parameter, and wherein said adjusting step (b) comprises visibly designating a most frequently used hot spot hypermedia function as a default hot spot hypermedia function of said multiple hot spot hypermedia functions.

15. In a hypermedia computing environment having a logical page and a plurality of hypermedia objects therein, at least some hypermedia objects of said plurality of hypermedia objects comprising information content, an adaptive method for managing at least one of information content or presentation of said plurality of hypermedia objects within the logical page, said method comprising the steps of:
   automatically acquiring within the hypermedia computing environment a user-based characteristic or a system utilization-based characteristic, and producing therefrom an adaptation parameter;
   automatically adjusting at least one of information content or presentation of said plurality of hypermedia objects within said logical page in response to said adaptation parameter; and
   wherein said means for automatically adjusting comprises means for automatically adjusting display order of said plurality of hypermedia objects by ordering a most frequently used hypermedia object of said plurality of hypermedia objects at a top of a primary window of said logical page.

16. A hypermedia computing system having a logical page and a plurality of hypermedia objects therein, at least some hypermedia objects of said plurality of hypermedia objects comprising information content, said system including means for managing at least one of information content or presentation of said plurality of hypermedia objects, said system comprising:
   means for automatically acquiring a user based characteristic or a system utilization based characteristic, and producing therefrom an adaptation parameter;
   means for automatically adjusting at least one of information content or presentation of said plurality of hypermedia objects within said logical page in response to said adaptation parameter; and
   wherein said means for acquiring comprises means for determining as said adaptation parameter at least one of frequency of direct selection and frequency of indirect selection of at least one hypermedia object of said plurality of hypermedia objects of the logical page.

17. The system of claim 16, wherein said means for acquiring further comprises means for determining said frequency of direct selection by counting a number of times said at least one hypermedia object is directly selected within said logical page.

18. The system of claim 16, wherein said means for acquiring comprises means for determining said frequency of indirect selection by counting a number of times said at least one hypermedia object is called by another hypermedia object of said plurality of hypermedia objects.

19. The system of claim 16, wherein said means for acquiring comprises means for combining said frequency of direct selection and said frequency of indirect selection into a single frequency of selection value comprising said frequency of use characteristic, each of said frequency of direct selection and said frequency of indirect selection having an individual weight assigned thereto with regard to said combining into said single frequency of selection value.

20. A hypermedia computing system having a logical page and a plurality of hypermedia objects therein, at least some hypermedia objects of said plurality of hypermedia objects comprising information content, said system including means for managing at least one of information content or presentation of said plurality of hypermedia objects, said system comprising:
   means for automatically acquiring a user based characteristic or a system utilization based characteristic, and producing therefrom an adaptation parameter;
   means for automatically adjusting at least one of information content or presentation of said plurality of hypermedia objects within said logical page in response to said adaptation parameter; and
   wherein said means for acquiring comprises means for determining a user based parameter, said user based parameter comprising said adaptation parameter, and wherein said means for acquiring further comprises means for determining a physiological user characteristic, said physiological user characteristic comprising said adaptation parameter.

21. The system of claim 20, wherein said physiological user characteristic comprises a hearing impairment, and wherein said means for automatically adjusting comprises at least one of means for ordering non-audio based hypermedia objects ahead of audio based hypermedia objects within said plurality of hypermedia objects, for removing audio based hypermedia objects within said plurality of hypermedia objects from a window of said logical page or for replacing audio based hypermedia objects with non-audio hypermedia based objects within a window of said logical page.

22. The system of claim 20, wherein said physiological user characteristic comprises color blindness, and wherein said means for automatically adjusting comprises means for altering a color scheme of said presentation of said plurality of hypermedia objects to account for said color blindness.

23. A hypermedia computing system having a logical page and a plurality of hypermedia objects therein, at least some hypermedia objects of said plurality of hypermedia objects comprising information content, said system including means for managing at least one of information content or presentation of said plurality of hypermedia objects, said system comprising:

means for automatically acquiring a user based characteristic or a system utilization based characteristic, and producing therefrom an adaptation parameter;

means for automatically adjusting at least one of information content or presentation of said plurality of hypermedia objects within said logical page in response to said adaptation parameter; and wherein said means for acquiring comprises means for determining a user based parameter, said user based parameter comprising said adaptation parameter, and wherein said means for acquiring includes means for determining a user experience level, said user experience level comprising said user based parameter.

24. The system of claim 23, wherein said means for automatically adjusting comprises means for suppressing display of at least one hypermedia object of said plurality of hypermedia objects, said at least one hypermedia object having said display thereof suppressed being inappropriate for said user experience level.

25. A hypermedia computing system having a logical page and a plurality of hypermedia objects therein, at least some hypermedia objects of said plurality of hypermedia objects comprising information content, said system including means for managing at least one of information content or presentation of said plurality of hypermedia objects, said system comprising:

means for acquiring an adaptation parameter;

means for automatically adjusting at least one of information content or presentation of said plurality of hypermedia objects within said logical page in response to said adaptation parameter; and wherein said means for automatically adjusting comprises means for automatically adjusting a display order of said plurality of hypermedia objects within said display window in response to said adaptation parameter.

26. A hypermedia computing system having a logical page and a plurality of hypermedia objects therein, at least some hypermedia objects of said plurality of hypermedia objects comprising information content, said system including means for managing at least one of information content or presentation of said plurality of hypermedia objects, said system comprising:

means for acquiring an adaptation parameter;

means for automatically adjusting at least one of information content or presentation of said plurality of hypermedia objects within said logical page in response to said adaptation parameter; and wherein said logical page comprises a pop-up, hot spot selection window having multiple hot spot hypermedia functions, each hot spot hypermedia function comprising a hypermedia object of said plurality of hypermedia objects, and wherein said means for automatically adjusting comprises means for automatically adjusting presentation of said multiple hot spot hypermedia functions within said pop-up, hot spot selection window in response to said adaptation parameter.

27. The system of claim 26, wherein said means for acquiring comprises means for determining a frequency of use for each of said multiple hot spot hypermedia functions, said frequency of use comprising said adaptation parameter, and wherein said adjusting step (b) comprises visibly designating a most frequently used hot spot hypermedia function as a default hot spot hypermedia function of said multiple hot spot hypermedia functions.

28. In a hypermedia computing environment having a logical page and a plurality of hypermedia objects therein, at least some hypermedia objects of said plurality of hypermedia objects comprising information content, an adaptive method for managing at least one of information content or presentation of said plurality of hypermedia objects within said logical page, said method comprising the steps of:

automatically acquiring within the hypermedia computing environment a user based characteristic or a system utilization based characteristic, and producing therefrom an adaptation parameter;

automatically adjusting at least one of information content or presentation of said plurality of hypermedia objects within said logical page in response to said adaptation parameter; and wherein said automatically acquiring comprises acquiring an adaptation parameter comprising at least one of: a frequency of use characteristic of at least one of the hypermedia objects of the logical page; a frequency of direct selection of at least one of the hypermedia objects of the logical page; a frequency of indirect selection of at least one of the hypermedia objects of the logical page; or a user based parameter.

29. In a hypermedia computing environment having a logical page and a plurality of hypermedia objects therein, at least some hypermedia objects of said plurality of hypermedia objects comprising information content, a method for managing at least one of information content or presentation of said plurality of hypermedia objects within the logical page, said method comprising the steps of:

acquiring an adaptation parameter;

automatically adjusting at least one of information content or presentation of said plurality of hypermedia objects within said logical page in response to said adaptation parameter; and wherein said acquiring comprises acquiring multiple adaptation parameters, said multiple adaptation parameters comprising at least some of a frequency of use characteristic of at least one hypermedia object of the plurality of hypermedia objects of the logical page, a frequency of direct selection of at least one of the hypermedia objects of the logical page, a frequency of indirect selection of at least one of the hypermedia objects of the logical page, and a user based parameter.

and wherein said automatically adjusting comprises automatically adjusting said at least one of information content or presentation of said plurality of hypermedia objects within the logical page in response to said multiple adaptation parameters.

30. In a hypermedia computing environment having a logical page and a plurality of hypermedia objects therein, at least some hypermedia objects of said plurality of hypermedia objects comprising information content, a method for managing at least one of information content or presentation of said plurality of hypermedia objects within the logical pare, said method comprising the steps of:

acquiring an adaptation parameter;

automatically adjusting at least one of information content or presentation of said plurality of hypermedia objects within said logical page in response to said adaptation parameter; and wherein said plurality of hypermedia objects within said logical page comprise a predefined collection of only related hypermedia objects with information content which can be made available to a user of the hypermedia computing environment, and wherein said logical page comprises a primary window and one or more secondary windows, said automatically adjusting comprising automatically adjusting said at least one of information content or presentation of said plurality of hypermedia objects within said primary window and said one or more secondary windows.

31. The method of claim 30, wherein said logical page provides physical and logical correlation of said plurality of hypermedia objects therein, said physical correlation being provided by placement and presentation of the hypermedia objects within the logical page, and said logical correlation being maintained by hypermedia links to said primary window or said one or more secondary windows of said logical page, and wherein said adjusting step (b) comprises adjusting at least one of physical or logical correlation of at least one hypermedia object of the plurality of hypermedia objects in the logical page.

32. In a hypermedia computing environment having a logical page and a plurality of hypermedia objects therein, at least some hypermedia objects of said plurality of hypermedia objects comprising information content, a method for managing at least one of information content or presentation of said plurality of hypermedia objects within the logical page, said method comprising the steps of:

acquiring an adaptation parameter;

automatically adjusting at least one of information content or presentation of said plurality of hypermedia objects within said logical page in response to said adaptation parameter; and wherein the said automatically adjusting comprises dynamically adjusting both said information content and said presentation of said plurality of hypermedia objects within the logical page in response to said adaptation parameter.

33. In a hypermedia computing environment having a logical page and a plurality of hypermedia objects therein, at least some hypermedia objects of said plurality of hypermedia objects comprising information content, a method for managing at least one of information content or presentation of said plurality of hypermedia objects within the logical pare, said method comprising the steps of:

acquiring an adaptation parameter;

automatically adjusting at least one of information content or presentation of said plurality of hypermedia objects within said logical page in response to said adaptation parameter; and wherein said automatically adjusting comprises automatically adjusting information content of said plurality of hypermedia objects by ordering, adding or removing hypermedia objects in the logical page based on said acquired adaptation parameter.

34. In a hypermedia computing environment having a logical page and a plurality of hypermedia objects therein, at least some hypermedia objects of said plurality of hypermedia objects comprising information content, a method for managing at least one of information content or presentation of said plurality of hypermedia objects within the logical page, said method comprising the steps of:

acquiring an adaptation parameter;

automatically adjusting at least one of information content or presentation of said plurality of hypermedia objects within said logical page in response to said adaptation parameter; and wherein said logical page comprises multiple windows and a hypermedia link network, and wherein said automatically adjusting comprises automatically adjusting the hypermedia link network for said plurality of hypermedia objects within the logical page based upon said acquired adaptation parameter.

35. A hypermedia computing system having a logical page and a plurality of hypermedia objects therein, at least some hypermedia objects of said plurality of hypermedia objects comprising information content, said system including means for managing at least one of information content or presentation of said plurality of hypermedia objects, said system comprising:

means for automatically acquiring a user based characteristic or a system utilization based characteristic, and producing therefrom an adaptation parameter;

means for automatically adjusting at least one of information content or presentation of said plurality of hypermedia objects within said logical page in response to said adaptation parameter; and wherein said means for acquiring comprises means for acquiring an adaptation parameter which comprises at least one of a frequency of use characteristic of at least one of the hypermedia objects of the logical page, a frequency of direct selection of at least one of the hypermedia objects of the logical page, a frequency of indirect selection of at least one of the hypermedia objects of the logical page, or a user based parameter.

36. A hypermedia computing system having a logical page and a plurality of hypermedia objects therein, at least some hypermedia objects of said plurality of hypermedia objects comprising information content, said system including means for managing at least one of information content or presentation of said plurality of hypermedia objects, said system comprising:

means for acquiring an adaptation parameter;

means for automatically adjusting at least one of information content or presentation of said plurality of hypermedia objects within said logical page in response to said adaptation parameter; and wherein said means for acquiring comprises means for acquiring multiple adaptation parameters, said multiple adaptation parameters comprising at least some of a frequency of use characteristic of at least one hypermedia object of the plurality of hypermedia objects of the logical page, a frequency of direct selection of at least one of the hypermedia objects of the logical page, a frequency of indirect selection of at least one of the hypermedia objects of the logical page, and a user based parameter, and wherein said means for automatically adjusting comprises means for automatically adjusting said at least one of information content or presentation of said plurality of hypermedia objects within the logical page in response to said multiple adaptation parameters.

37. A hypermedia computing system having a logical page and a plurality of hypermedia objects therein, at least some hypermedia objects of said plurality of hypermedia objects comprising information content, said system including means for managing at least one of information content or presentation of said plurality of hypermedia objects, said system comprising:

means for acquiring an adaptation parameter;

means for automatically adjusting at least one of information content or presentation of said plurality of hypermedia objects within said logical pave in response to said adaptation parameter; and wherein said plurality of hypermedia objects within said logical page comprise a predefined collection of only related hypermedia objects with information content which can be made available to a user of the hypermedia computing environment, and wherein said logical page comprises a primary window and one or more secondary windows, said adjusting comprising automatically adjusting said at least one of information content or presentation of said plurality of hypermedia objects within said primary window and said one or more secondary windows.

38. A hypermedia computing system having a logical sage and a plurality of hypermedia objects therein, at least some hypermedia objects of said plurality of hypermedia objects comprising information content, said system including means for managing at least one of information content or presentation of said plurality of hypermedia objects, said system comprising:

means for acquiring an adaptation parameter;

means for automatically adjusting at least one of information content or presentation of said plurality of hypermedia objects within said logical page in response to said adaptation parameter; and wherein said means for automatically adjusting comprises means for dynamically adjusting both said information content and said presentation of said plurality of hypermedia objects within the logical page in response to said adaptation parameter.

* * * * *

UNITED STATES PATENT AND TRADEMARK OFFICE
CERTIFICATE OF CORRECTION

PATENT NO. : 5,799,292
DATED : August 25, 1998
INVENTOR(S) : Amir Hekmatpour

It is certified that error appears in the above-identified patent and that said Letters Patent is hereby corrected as shown below:

In the Claims:

Claim 10 - Col. 12, line 51, delete "sage" and replace with --page--.

Claim 30 - Col. 17, line 12, delete "pare" and replace with --page--.

Claim 33 - Col. 17, line 64, delete "pare" and replace with --page--.

Claim 37 - Col. 19, line 20, delete "pave" and replace with --page--.

Claim 38 - Col. 20, line 7, delete "sage" and replace with --page--.

Signed and Sealed this

Sixteenth Day of February, 1999

Attest:

*Attesting Officer*

*Acting Commissioner of Patents and Trademarks*